(12) United States Patent
Nakamura et al.

(10) Patent No.: US 10,373,024 B2
(45) Date of Patent: Aug. 6, 2019

(54) IMAGE PROCESSING DEVICE, OBJECT DETECTION DEVICE, IMAGE PROCESSING METHOD

(71) Applicant: HITACHI, LTD., Tokyo (JP)

(72) Inventors: Katsuyuki Nakamura, Tokyo (JP); Yasuhiro Akiyama, Tokyo (JP); Tatsuhiko Kagehiro, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/562,535

(22) PCT Filed: Apr. 2, 2015

(86) PCT No.: PCT/JP2015/060482
§ 371 (c)(1),
(2) Date: Sep. 28, 2017

(87) PCT Pub. No.: WO2016/157499
PCT Pub. Date: Oct. 6, 2016

(65) Prior Publication Data
US 2018/0107901 A1 Apr. 19, 2018

(51) Int. Cl.
*G06K 9/62* (2006.01)
*G06T 7/70* (2017.01)
(Continued)

(52) U.S. Cl.
CPC ....... *G06K 9/6262* (2013.01); *G06K 9/00791* (2013.01); *G06K 9/4628* (2013.01);
(Continued)

(58) Field of Classification Search
CPC ....... G06K 9/00228; G06K 2009/3291; G06K 2009/4666; G06K 9/00248; G06K 9/3241;
(Continued)

(56) References Cited

U.S. PATENT DOCUMENTS 6,262,742 B1 * 7/2001 Tampieri ................. G06T 15/00
345/426
7,551,755 B1 * 6/2009 Steinberg ........... G06K 9/00228
340/5.53
(Continued)

FOREIGN PATENT DOCUMENTS

JP 2002-259974 A 9/2002
JP 2009-282824 A 12/2009
(Continued)

OTHER PUBLICATIONS

Naoya Koketsu et al., "Improvement in Human Detection by Generation Addition Training of Human Silhouette", IPSJ SIG Notes, Heisei 22 Nendo 3, Oct. 15, 2010.
(Continued)

*Primary Examiner* — Aklilu K Woldemariam
(74) *Attorney, Agent, or Firm* — Mattingly & Malur, PC

(57) ABSTRACT

An image processing device for evaluating a classifier which recognizes a target object within an input image and classifies the target object into one among a plurality of classes, includes: a classification unit which obtains a classification performance of the classifier by using the classifier and classifying the target object included in each of a plurality of verification images in which a class of the target object is known, and outputting one among the plurality of classes for each of the verification images; and an evaluation unit which outputs an evaluation result of the classifier based on the classification performance of the classifier obtained with the classification unit.

10 Claims, 11 Drawing Sheets

(51) Int. Cl.
*G06K 9/00* (2006.01)
*G06K 9/46* (2006.01)

(52) U.S. Cl.
CPC ............... *G06K 9/628* (2013.01); *G06T 7/70* (2017.01); *G06T 2200/04* (2013.01); *G06T 2207/20081* (2013.01); *G06T 2207/30252* (2013.01)

(58) Field of Classification Search
CPC .......... G06K 9/00234; G06K 9/00268; G06K 9/00288; G06K 9/00362; G06K 9/00369; G06K 9/00604; G06K 9/0061; G06K 9/00617; G06K 9/4642; G06K 9/6202; G06K 9/00255; G06K 9/00389; G06K 9/00912; G06K 9/00986; G06K 9/4619; G06K 9/605; G06K 9/00221; G06K 9/00261; G06K 9/00456; G06K 9/00771; G06K 9/6256; G06K 9/6292; G06K 2209/21; G06K 9/00335; G06K 9/00281; G06K 9/6269; G06T 7/246; G06T 2207/10016; G06T 2207/30201; G06T 2207/30216; G06T 7/90; G06T 2207/10012; G06T 7/262; G06T 7/70; G06T 7/00; G06T 7/11; G06T 1/0007; G06T 7/0002; G06T 2207/20081; H04N 5/23219; H04N 1/62; H04N 1/624; H04N 2101/00; H04N 5/23212; H04N 5/23222; H04N 5/235; H04N 5/772; H04N 13/239; H04N 13/246; H04N 13/302; H04N 13/366; H04N 2013/0081; H04N 5/23241; H04N 5/23245; H04N 1/00326; H04N 5/347; H04N 2201/3252; H04N 2201/3267; G06F 1/1686; G06F 1/3215; G06F 1/3231; G06F 3/011; G06F 3/013; G06F 3/017; G06F 3/0304; G06F 17/30247; G06F 17/30047; G06F 7/70; G06F 7/00; G06F 19/24; G06F 17/30876; G06F 17/30784; G06F 17/3079; Y02A 90/24; F41G 7/343
USPC ....... 382/103, 117, 118, 167, 190, 209, 276; 348/241, 239
See application file for complete search history.

(56) References Cited

U.S. PATENT DOCUMENTS

| | | | | |
|---|---|---|---|---|
| 9,672,653 | B2* | 6/2017 | Hart .................... | G06T 15/005 |
| 2002/0122592 | A1* | 9/2002 | Ishikawa ............ | G06K 9/00228 382/190 |
| 2004/0179719 | A1* | 9/2004 | Chen .................. | G06K 9/00234 382/118 |
| 2005/0264658 | A1* | 12/2005 | Ray .................... | G06K 9/00228 348/239 |
| 2006/0204055 | A1* | 9/2006 | Steinberg ........... | H04N 5/23212 382/118 |
| 2006/0244820 | A1* | 11/2006 | Morita ................. | G06T 19/006 348/14.13 |
| 2009/0242912 | A1* | 10/2009 | Altebaeumer ......... | B82Y 10/00 257/89 |
| 2010/0296706 | A1* | 11/2010 | Kaneda .............. | G06K 9/00281 382/118 |
| 2011/0001850 | A1* | 1/2011 | Gaubatz ............. | G06K 9/00228 348/241 |
| 2011/0243461 | A1* | 10/2011 | Nayar ................ | G06K 9/00281 382/224 |
| 2011/0301934 | A1* | 12/2011 | Tardif ..................... | G06F 3/017 704/1 |
| 2012/0069222 | A1* | 3/2012 | Steinberg ............... | G06K 9/036 348/239 |
| 2012/0123806 | A1* | 5/2012 | Schumann, Jr. ....... | G06Q 40/08 705/4 |
| 2013/0321672 | A1* | 12/2013 | Silverstein ............ | H04N 5/365 348/241 |
| 2013/0321673 | A1* | 12/2013 | Lim .......................... | G06T 1/20 348/241 |
| 2014/0079314 | A1* | 3/2014 | Yakubovich ......... | G06K 9/6254 382/159 |
| 2014/0201126 | A1* | 7/2014 | Zadeh ................... | G06K 9/627 706/52 |
| 2014/0309870 | A1* | 10/2014 | Ricci ...................... | H04W 4/21 701/36 |
| 2015/0035440 | A1* | 2/2015 | Spero ...................... | B60Q 1/04 315/153 |
| 2015/0055821 | A1* | 2/2015 | Fotland ................ | G06K 9/3241 382/103 |
| 2015/0242708 | A1* | 8/2015 | Duan ................... | G06K 9/4642 382/159 |
| 2015/0363967 | A1* | 12/2015 | Wells ...................... | G06T 15/20 345/419 |
| 2017/0177938 | A1* | 6/2017 | Papanikolopoulos ...................... G06K 9/00657 | |

FOREIGN PATENT DOCUMENTS

| | | |
|---|---|---|
| JP | 2012-123642 | 6/2012 |
| JP | 2014-115920 A | 6/2014 |
| JP | 2014-157509 A | 8/2014 |
| JP | 2014-178229 A | 9/2014 |

OTHER PUBLICATIONS

International Search Report of PCT/JP2015/060482 dated Jun. 30, 2015.

* cited by examiner

FIG.3

| SUPERORDINATE CATEGORY | A | | | B | | | C | | | ... | | | Z | | |
|---|---|---|---|---|---|---|---|---|---|---|---|---|---|---|---|
| SUB CATEGORY | a | b | ... z | a | b | ... z | a | b | ... z | a | b | ... z | a | b | ... z |
| EVALUATION STANDARD 1 | | | | | | | | | | | | | | | |
| EVALUATION STANDARD 2 | | | | | | | | | | | | | | | |
| EVALUATION STANDARD 3 | | | | | | | | | | | | | | | |
| ... | | | | | | | | | | | | | | | |
| EVALUATION STANDARD N | | | | | | | | | | | | | | | |

301

IMAGE PROCESSING DEVICE, OBJECT DETECTION DEVICE, IMAGE PROCESSING METHOD

TECHNICAL FIELD

The present invention relates to an image processing device, an object detection device, and an image processing method.

BACKGROUND ART

In the field of image processing, an object recognition technology based on machine learning is widely prevalent. Based on this technology, for example, the practical application of automotive active safety systems for preventing traffic accidents and monitoring systems for reporting the intrusion of a suspicious person is underway. With these systems, the learning of a classifier, which recognizes objects, is performed by collecting and organizing training images of the object to be recognized, and using machine learning methods as represented by support vector machines, boosting, and multilayer neural networks.

The technique described in PTL 1 is known for streamlining the organization of training data to be used in machine learning. PTL 1 discloses a technique of utilizing CG (Computer Graphics) and generating a learning image of a three-dimensional shape model viewed from an arbitrary viewpoint, and using the generated learning image to perform the generation and learning of a classifier.

CITATION LIST

Patent Literature

[PTL 1] Japanese Laid-Open Patent Publication No. 2014-157509

SUMMARY OF THE INVENTION

Technical Problem

While the technique of PTL 1 is able to generate a learning image of an arbitrary viewpoint, it is not possible to properly evaluate the level of the classification performance of the classifier that was generated and learned using the learning image.

Solution to Problem

An image processing device according to the present invention for evaluating a classifier which recognizes a target object within an input image and classifies the target object into one among a plurality of classes, comprises: a classification unit which obtains a classification performance of the classifier by using the classifier and classifying the target object included in each of a plurality of verification images in which a class of the target object is known, and outputting one among the plurality of classes for each of the verification images; and an evaluation unit which outputs an evaluation result of the classifier based on the classification performance of the classifier obtained with the classification unit.

An object detection device according to the present invention, comprises: an object detection unit which detects an object in an image input from a camera by using a classifier which was subject to learning by using the above image processing device; and a danger determination unit which determines a danger of an object detected by the object detection unit.

An image processing method according to the present invention which uses a computer for evaluating a classifier which recognizes a target object within an input image and classifies the target object into one among a plurality of classes, comprises: using the computer to obtain a classification performance of the classifier by using the classifier and classifying the target object included in each of a plurality of verification images in which a class of the target object is known, and outputting one among the plurality of classes for each of the verification images; and using the computer to output an evaluation result of the classifier based on the obtained classification performance of the classifier.

Advantageous Effects of Invention

According to the present invention, the classification performance of a classifier can be properly evaluated.

BRIEF DESCRIPTION OF DRAWINGS

FIG. 3 is a diagram showing an example of a table illustrating the classification performance of a classifier.

DESCRIPTION OF EMBODIMENTS

First Embodiment

Figure 1:
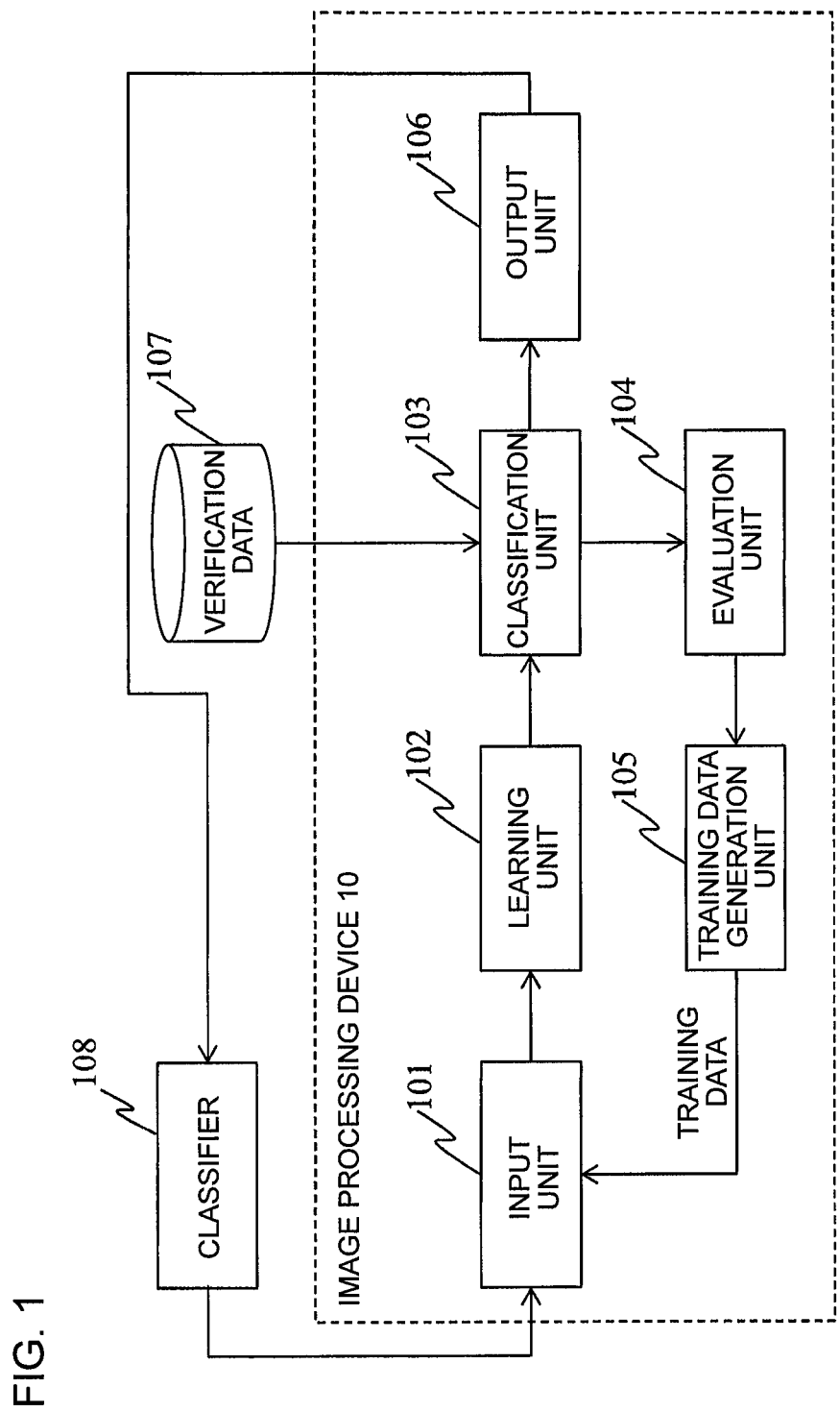
FIG. 1 is a block diagram showing a configuration of the image processing device according to the first embodiment.

FIG. 1 is a block diagram showing a configuration of an image processing device 10 according to the first embodiment of the present invention. The image processing device 10 shown in FIG. 1 comprises an input unit 101, a learning unit 102, a classification unit 103, an evaluation unit 104, a training data generation unit 105, and an output unit 106. A database 107 storing verification data, and a classifier 108 are connected to the image processing device 10. Note that the database 107 and the classifier 108 may also be respectively provided inside the image processing device 10. The respective components of the image processing device 10 may be configured from hardware, or configured from software to be executed by a computer. Moreover, the respective components may also be a module obtained by combining hardware and software.

The input unit 101 is the part that sets input data in the learning unit 102. The learning unit 102 is the part that uses the data input from the input unit 101 and performs the learning of the classifier 108. The classification unit 103 is the part that uses the classifier 108 to classify the target object from the verification data stored in the database 107, and obtains the classification performance of the classifier 108 based on the classification result. The evaluation unit 104 is the part that evaluates the classifier 108 based on the classification performance of the classifier 108 obtained by the classification unit 103. The training data generation unit 105 is the part that generates training data for use in the learning of the classifier 108 by the learning unit 102 based on the evaluation result of the classifier 108 by the evaluation unit 104. The output unit 106 is the part that determines the learning state of the classifier 108 by the learning unit 102 and outputs the learned classifier 108.

The classifier 108 recognizes or discriminates the target object within the input image and classifies the target object into one among a plurality of classes. The classification performance of the classifier 108 can be improved based on the learning performed by the learning unit 102. The verification data stored in the database 107 includes images of the target object to be classified by the classifier 108, and is configured from a plurality of verification images in which the class of the target object is known, and class information indicating the class of the target object in each of the verification images. Note that, while an actual image is preferably used as the verification image, the verification image may also contain a CG image.

Figure 2:
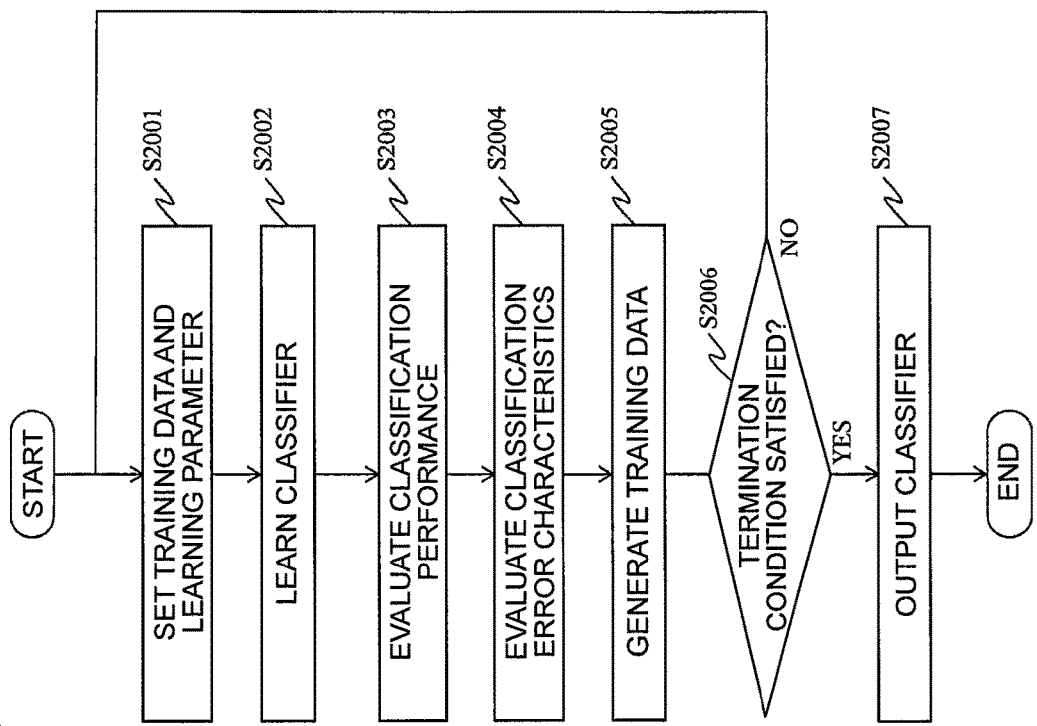
FIG. 2 is a flowchart explaining the operation of the image processing device according to the first embodiment.

FIG. 2 is a flowchart explaining the operation of the image processing device 10 according to the first embodiment of the present invention.

In step S2001, the input unit 101 receives an input from the classifier 108 to be subject to evaluation and learning, and sets the training data and the learning parameters to be used in the learning of the classifier 108 by the learning unit 102 based on the training data output from the training data generation unit 105. The input unit 101 subsequently outputs the input classifier 108 and the set these data as input data to the learning unit 102.

In step S2002, the learning unit 102 performs the learning of the classifier 108 based on the training data and the learning parameters included in the input data from the input unit 101. Here, as the classifier 108, for instance, a multi-class classifier as represented by a Deep Convolutional Neural Network (DCNN) may be used. Moreover, as the learning algorithm to be used in the learning of the classifier 108 by the learning unit 102, for instance, an optimization algorithm such as the steepest descent method, the Newton method, or the Stochastic Gradient Descent (SGD) may be used. In the foregoing case, as the learning parameters, used may be the learning rate, various types of activation functions (for example, Sigmoid function, ReLU, hyperbolic function and the like), batch size, filter size, and number of filters. Note that the classifier 108 is not limited to DCNN. The classifier 108 may also be configured by utilizing a Deep Neural Network (DNN) as a totally coupled network, a multi-class support vector machine, or logistic regression.

In step S2003, the classification unit 103 uses the verification data stored in the database 107 and evaluates the classification performance of the classifier 108 which was subject to learning in step S2002. Here, the classification unit 103 uses the classifier 108 and recognizes the target object included in each of the plurality of verification images in the verification data, and classifies the target object into one among a plurality of predetermined classes. Subsequently, the classification unit 103 determines, for each verification image, whether or not the classification result of the target object by the classifier 108 is correct by comparing the obtained class classifying result of the target object in each of the verification images, and the class information of the verification data. The classification unit 103 can obtain the classification performance of the classifier 108 by collecting the results of the foregoing determination.

FIG. 3 is a diagram showing an example of a table illustrating the classification performance of the classifier 108 obtained by the classification unit 103. As an example illustrating the classification performance of the classifier 108 in a table format, FIG. 3 shows an evaluation table 301 which collects the classification results of the target object in the verification image for each superordinate category and each sub category.

In the evaluation table 301 of FIG. 3, the superordinate category represents each class type in the multi-class classification performed by the classifier 108. For example, when the classifier 108 is to perform classification with various types of subjects in an image which captured the periphery of a vehicle as the target objects, large-sized vehicles, medium-sized vehicles, small-sized vehicles, bicycles, pedestrians, background and the like are set as the superordinate categories. Meanwhile, the sub category represents an attribute obtained by further subdividing each superordinate category. For example, for each of the foregoing superordinate categories, vehicle class such as sedan, light motor vehicle, truck or bus, vehicle body color such as red, white or black, posture of object viewed from a camera such as 0 degrees, 45 degrees or 90 degrees, and background class such as urban area, suburb area or mountain area are set as the sub categories.

The classification unit 103 calculates the evaluation value according to various types of evaluation standards (or criterion) for each superordinate category and each sub category based on the classification result of the target object by the classifier 108 in each verification image. Subsequently, the evaluation table 301 can be created by collecting the calculated evaluation values. In FIG. 3, N-types of evaluation standards are set, and FIG. 3 shows an example of compiling the evaluation values of each evaluation standard in the evaluation table 301. Note that various types of indexes may be used as the foregoing evaluation values for prescribing the classification performance of the classifier 108. For example, "Recall" as the index of detection performance of the target object; that is, the index of completeness upon detecting the target object to be classified from the image, "Precision" as the index of detection accuracy of the target object; that is, the index of accuracy upon detecting the target object to be classified from the image, or "F-measure" as the index which gives consideration to both detection performance and detection accuracy may be used as the evaluation value. Moreover, as the evaluation value of the classifying result for each sub category, used may be a maximum certainty factor, a minimum certainty factor, an average certainty factor or the like.

Returning to the explanation of FIG. 2, in step S2004, the evaluation unit 104 evaluates the classification error characteristics of the classifier 108 based on the evaluation result of the classification performance by the classification unit 103 in step S2003. Here, the evaluation unit 104 identifies at least one superordinate category and at least one sub category as the categories with insufficient training data based on the evaluation values collected in the evaluation table 301 illustrated in FIG. 3. For example, the evaluation unit 104 identifies, as the categories with insufficient training data, a combination of a superordinate category and a sub category in which "Recall" is a predetermined value or less in the evaluation table 301, or a combination of a superordinate category and a sub category in which the average certainty factor is negative. Consequently, the classification error characteristics of the classifier 108 can be evaluated by the evaluation unit 104 determining which category has insufficient training data from the evaluation result of the classification performance by the classification unit 103. Subsequently, the evaluation unit 104 outputs, to the training data generation unit 105, information of the superordinate category and the sub category which were identified as the categories with insufficient training data as the evaluation result of the classifier 108.

Note that, when outputting the evaluation result of the classifier 108 in step S2004, the evaluation unit 104 may also output information of a sub category other than the sub category that was identified as described above based on a correlation between the respective sub categories. For example, let it be assumed that RV and SUV were set as the sub categories representing the vehicle class. In the foregoing case, it is assumed that vehicles corresponding to these vehicle classes have similar shapes, and that their mutual correlation is high. Accordingly, when one of these sub categories is identified, information of the other sub category may also be output as well.

In step S2005, the training data generation unit 105 generates training data based on information of the category output from the evaluation unit 104 as the evaluation result of the classifier 108 in step S2004. Note that the details of the method for the training data generation unit 105 to generate training data will be described later with reference to FIG. 4, FIG. 5, FIG. 6, and FIG. 7.

In step S2006, the output unit 106 determines whether the learning state of the classifier 108 by the learning unit 102 has satisfied a predetermined termination condition. Here, the learning state of the classifier 108 is determined based on the evaluation result of the classification performance obtained by the classification unit 103 in step S2003. For example, it is possible to determine that the learning state of the classifier 108 has satisfied the termination condition when all evaluation values in the evaluation table 301 illustrated in FIG. 3 are a predetermined value or higher, or when the amount of cost reduction based on the learning becomes less than a predetermined value. Consequently, when it is determined that the learning state of the classifier 108 has satisfied the termination condition, the processing of FIG. 2 is advanced to step S2007. Meanwhile, when it is determined that the learning state of the classifier 108 has not satisfied the termination condition, the routine returns to step S2001 and the foregoing processing is repeated.

Otherwise, in step S2006, the output unit 106 may calculate the index value representing the learning state of the classifier 108 from the evaluation value of each category in the evaluation table 301, and determine whether or not the learning state of the classifier 108 satisfies the termination condition by comparing the index value and a predetermined reference value. The specific processing contents in the foregoing case are now explained with reference to FIG. 4.

Figure 4:
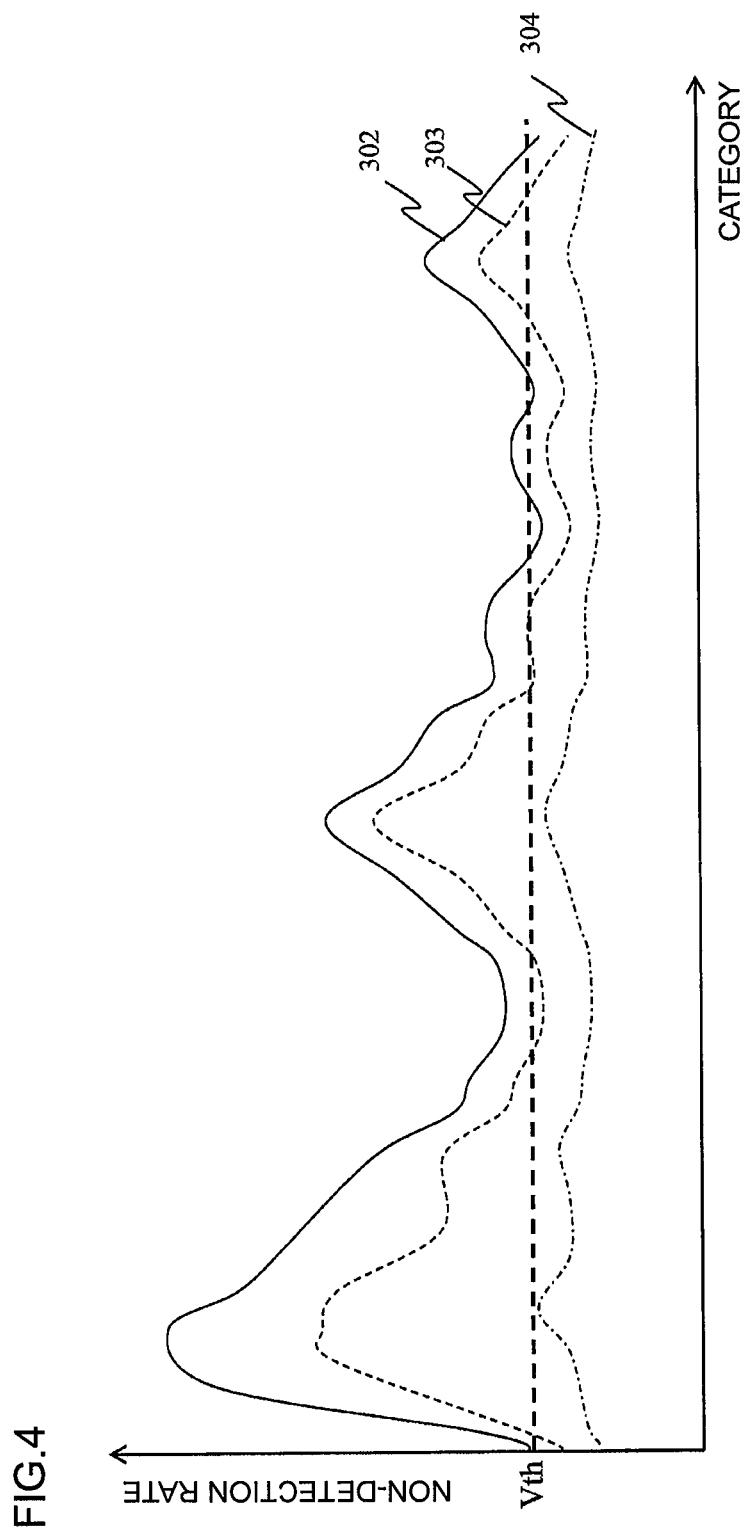
FIG. 4 is a diagram showing the change of the non-detection rate for each category.

FIG. 4 is a diagram showing the change of the non-detection rate for each category calculated based on the foregoing "Recall" among the evaluation values in the evaluation table 301. Here, when the value of the non-detection rate is Vu, and the value of Recall is Vr, Vu=1.0−Vr can be calculated. In FIG. 4, a solid line 302 represents the non-detection rate Vu for each category obtained from the first learning, and a broken line 303 represents the non-detection rate Vu for each category obtained from the second learning. Moreover, a dashed dotted line 304 represents the non-detection rate Vu for category obtained from the N-th learning. As shown in FIG. 4, while the solid line 302 and the broken line 303 have a section (category) which exceeds a threshold Vth, with the dashed dotted line 304, all sections (categories) fall below the threshold Vth. Consequently, with the non-detection rate Vu as the index value of the learning state of the classifier 108, and the non-detection rate Vu being equal to or less than the threshold Vth as the termination condition, it is possible to determine that the learning state of the classifier 108 satisfied the termination condition based on the N-th learning.

Returning to the explanation of FIG. 2, in step S2007, the output unit 106 outputs the learned classifier 108 obtained from the learning performed up to such point in time. Consequently, the learning of the classifier 108 by the learning unit 102 is terminated in the image processing device 10.

Once the processing of step S2007 is executed, the image processing device 10 completes the processing shown in the flowchart of FIG. 2.

Figure 5:
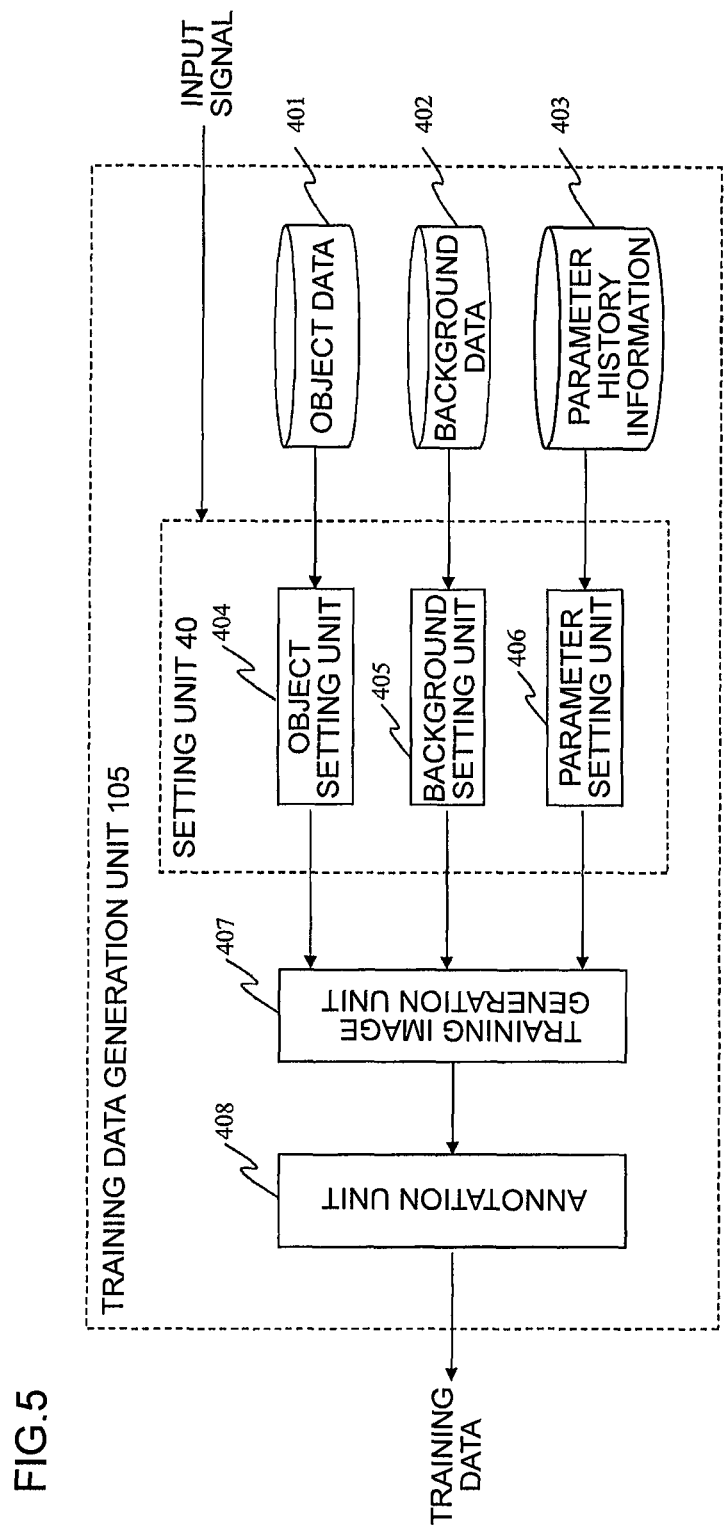
FIG. 5 is a block diagram showing a configuration example of the training data generation unit.

Details of the method for the training data generation unit 105 to generate training data in step S2005 of FIG. 2 are now explained. FIG. 5 is a block diagram showing a configuration example of the training data generation unit 105. The training data generation unit 105 shown in FIG. 5 comprises object data 401, background data 402, parameter history information 403, an object setting unit 404, a background setting unit 405, a parameter setting unit 406, a training image generation unit 407 and an annotation unit 408. Note that, in FIG. 5, the object setting unit 404, the background setting unit 405 and the parameter setting unit 406 are collectively indicated as the setting unit 40.

The object data 401 is data representing a three-dimensional shape model of the object to be classified by the classifier 108, and is configured from geometric information and material information. Geometric information includes information related to the shape of the object such as points, lines and surfaces, and information related to the structured parts of the object such as headlights, license plate and tires. Material information is information related to the characteristics of the material quality of the object such as reflection, transmission, refraction, and emission. The background data 402 is a three-dimensional shape model of the background to be classified by the classifier 108. Note that, by assuming image-based lighting (IBL), the background data 402 may also be retained as a global image rather than as a three-dimensional shape model. In the foregoing case, by combining a global image and a physical shader, it is possible to generate an image that is extremely close to the actual image. The parameter history information 403 is history information of the parameters that were previously used upon generating training data.

The object setting unit 404 sets object data to be used for generating the training image among the object data 401. The background setting unit 405 sets the background data to be used for generating the training image among the background data 402. The parameter setting unit 406 sets the parameters for generating the training image.

The training image generation unit 407 generates the training image based on the setting result of the setting unit 40. The annotation unit 408 generates the training data based on the training image generated by the training image generation unit 407, and outputs the generated training data.

Figure 6:
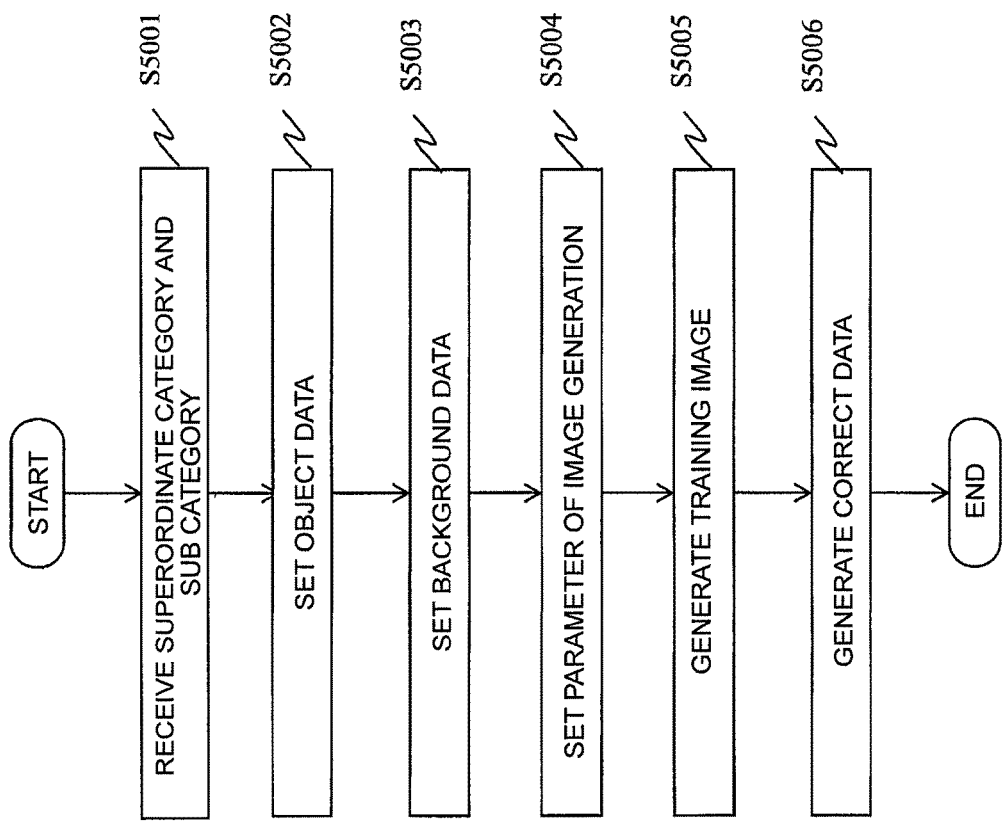
FIG. 6 is a flowchart explaining the operation of the training data generation unit.

FIG. 6 is a flowchart explaining the operation of the training data generation unit 105.

In step S5001, the setting unit 40 receives information of the superordinate category and the sub category output from the evaluation unit 104 in step S2004 of FIG. 2. As described above, the evaluation unit 104 outputs, as the evaluation result of the classification error characteristics of the classifier 108, information of the superordinate category and the sub category which were identified as the categories with insufficient training data. In step S5001, the foregoing information is input to the object setting unit 404, the background setting unit 405, and the parameter setting unit 406 of the setting unit 40, respectively.

In step S5002, the object setting unit 404 sets the object data for generating the training image based on the information of the superordinate category and the sub category received in step S5001. Here, based on the received information of the superordinate category and the sub category, object classes such as "Vehicle model: Coupe" and "Vehicle body color: Black" can be known as the categories with insufficient training data. Thus, the object data corresponding to these object classes is acquired from the object data 401, and set as the object data for generating the training image. Note that, in relation to the color, if the same color information does not exist in the object data 401, an approximate color or a new color may be generated by substituting the color information, and set as the object data. Moreover, the object data set by the object setting unit 404 is not limited to data related to a single object, and may also be data related to a plurality of types of objects.

In step S5003, the background setting unit 405 sets the background data for generating the training image based on the information of the superordinate category and the sub category received in step S5001. Here, based on the received information of the superordinate category and the sub category, background classes such as "urban area" and "direct afternoon sun" can be known as the categories with insufficient training data. Thus, the background data related to these background classes is acquired from the background data 402, and set as the background data for generating the training image. Note that the background data set by the background setting unit 405 is not limited to data related to a single background, and may also be data related to a plurality of types of backgrounds.

In step S5004, the parameter setting unit 406 sets the parameters for generating the training image based on the information of the superordinate category and the sub category received in step S5001. Here, based on the received information of the superordinate category and the sub category, image generation parameters such as "45-degree oblique angle when viewed from the camera" and "imaging distance is 50 meters afar" can be known as the categories with insufficient training data. Thus, these image generation parameters are set as the parameters for generating the training image. Here, a plurality of types of parameters may also be set.

Note that, when setting the parameters in step S5004, the parameter setting unit 406 refers to the parameter history information 403, and refrains from setting parameters that are the same as the previously used parameters based on the contents of the parameter history information 403. Consequently, the training data generation unit 105 can generate the training data by using the parameters that are different from the previously used parameters.

In step S5005, the training image generation unit 407 generates the training image based on the object data, the background data and the parameters that are respectively set by the object setting unit 404, the background setting unit 405, and the parameter setting unit 406 in steps S5002 to S5004. Here, for example, the training image is generated by using physically based rendering based on path tracing and synthesizing object data and background data so that the reflection, refraction, transmission, shadow and the like are reproduced physically correctly. Consequently, shadows on the road surface can be graphically reproduced. Moreover, the training image can also be generated by giving consideration to a physical camera. It is thereby possible to generate the training image by also giving consideration to the lens aberration and other factors in addition to basic camera internal parameters such as the focal length and the angle of view. Note that, as described above, in steps S5002 to S5004, a plurality of types of object data, background data, and parameters may also be set respectively. In the foregoing case, a plurality of types of training images will be generated according to the respective number of settings. For example, when five types of object data, background data, and parameters are respectively set, the training image generation unit 407 will generate a total of 125 training images.

In step S5006, the annotation unit 408 generates correct data of the training image generated by the training image generation unit 407 in step S5005. Here, based on the object data, the background data and the parameters used for generating the training data, it is possible to determine which part of the generated training image includes the target object to be classified, and to which superordinate category and sub category the target object belongs. The annotation unit 408 can generate the correct data based on the determination result.

Once the processing of step S5006 is executed, the training data generation unit 105 outputs the obtained training image and correct data as the training data, and completes the processing shown in the flowchart of FIG. 6.

Here, details of the method of generating the training image and the correct data in steps S5005 and S5006 of FIG. 6 are now explained with reference to FIG. 7 and FIG. 8.

Figure 7:
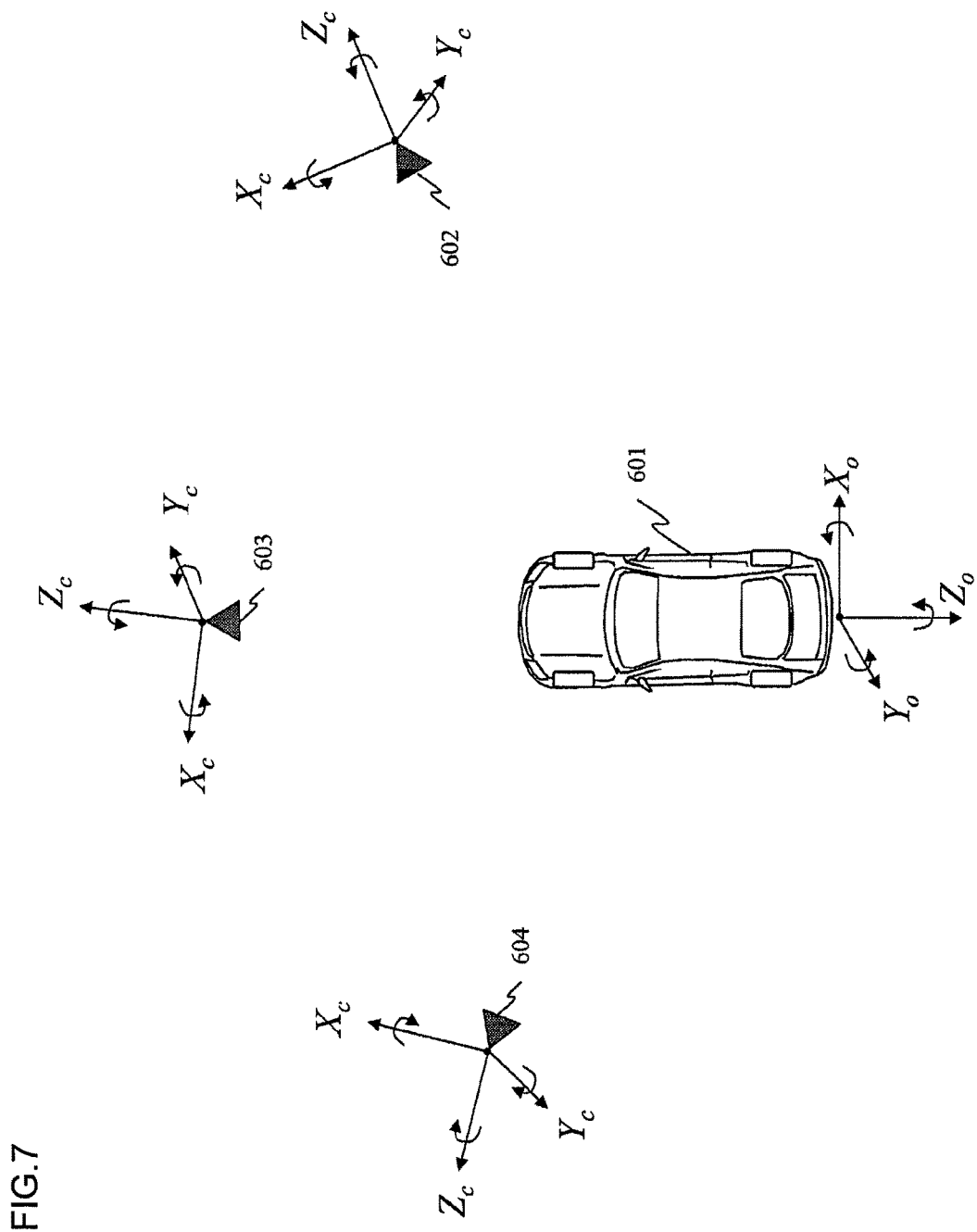
FIG. 7 is a diagram explaining the method of generating a training image.

FIG. 7 is a diagram explaining the method of generating the training image. FIG. 7 shows a situation where cameras 602, 603, 604 are installed to the recognition target object 601 as a vehicle, and a CG image corresponding to the captured image obtained by capturing the recognition target object 601 with these cameras is generated as the training image. The recognition target object 601 includes a triaxial rotation/translation parameter, and a triaxial scaling parameter. Moreover, the cameras 602, 603, 604 have a triaxial rotation/translation parameter, a triaxial scaling parameter, internal parameters (focal length, size of image sensor, image principal point and the like), and lens aberration parameters (strain coefficient, image height function and the like), respectively. These parameters are set by the parameter setting unit 406.

Figure 8:
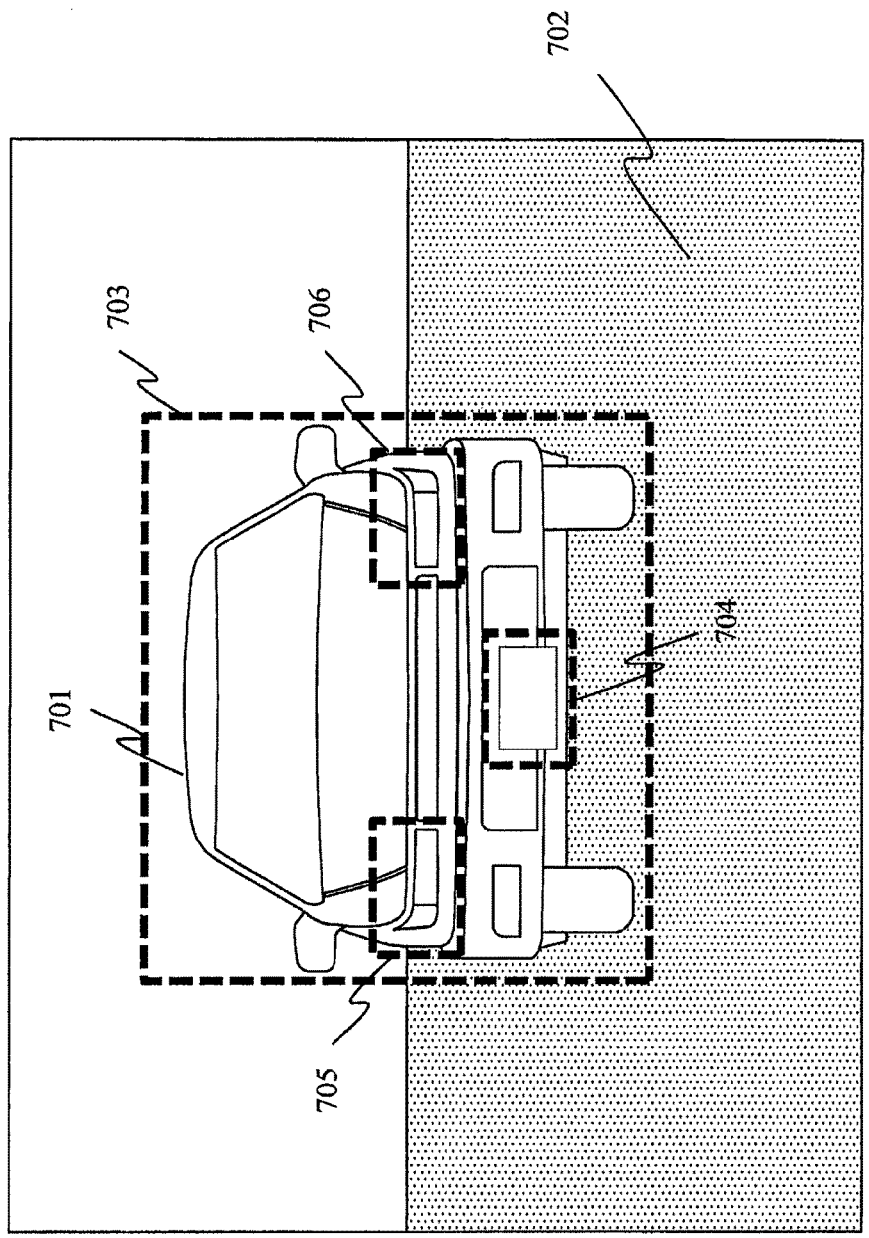
FIG. 8 is a diagram explaining the method of generating correct data.

FIG. 8 is a diagram explaining the method of generating the correct data. FIG. 8 shows, as an example of the training image, a CG image corresponding to the captured image obtained by capturing the recognition target object 601 from the camera 603 in the situation of FIG. 7. With this training image, an object image 701 representing the recognition target object 601 of FIG. 7 with a CG image, and a background image 702 representing the road surface of the background part with a CG image are synthesized. Moreover, bounding boxes 703, 704, 705 and 706 respectively corresponding to the overall part, the license plate part, the right headlight part, and the left headlight part of the recognition target object 601 as a vehicle are set in the object image 701.

As described above, the object data, the background data, and the camera parameters used for generating the training image of FIG. 8 are known. Thus, the position of the object image 701 in the generated training image can be calculated based on perspective projection.

For example, the bounding box 703 can be calculated by performing perspective projection of the overall three-dimensional shape information of the recognition target object 601 represented by the object data on the image. Moreover, by structuring the geometric information of the respective parts of the recognition target object 601 in the object data, the bounding boxes 704, 705, 706 can be calculated in the same manner as the bounding box 703. The correct data can be generated from the calculation results of the bounding boxes 703 to 706. Note that the correct data can also be labeled on the training image in pixel units. For example, by performing rendering with the transmittance of the object image 701 as 0% and the transmittance of the other parts as 100%, the correct label can be applied to the part of the object image 701 in the training image in pixel units.

The training data generation unit 105 generates the training image and the correct data in the manner explained above, and outputs the result as the training data. The training data generation unit 105 is thereby able to output, as the training data, the generated training image, and at least one piece of information among the coordinate information of the target object in the training image, the coordinate information of the specific part of the target object, information of the superordinate category (class) of the target object, and information of the sub category (attribute) of the target object.

As explained above, in the first embodiment of the present invention, the evaluation unit 104 evaluates the classification error characteristics of the classifier 108 that was subject to learning in the learning unit 102. It is thereby possible to automatically identify the superordinate category and the sub category which are difficult to classify by the current classifier 108.

Moreover, in the first embodiment of the present invention, the training data generation unit 105 is provided in the image processing device 10. It is thereby possible to automatically generate the training data for parts with insufficient learning.

Moreover, in the first embodiment of the present invention, the training data generation unit 105 outputs the training data including the coordinate information of the target object in the training image. By using this coordinate information, it is also possible to increase training data by performing rotation, translation, arbitrary conversion or the like on a two-dimensional image via data augmentation.

Moreover, in the first embodiment of the present invention, the training data generation unit 105 generates the training image by performing CG composition via physically based rendering based on path tracing. It is thereby possible to physically correctly reproduce the reflection, refraction, transmission, shadow and the like. Accordingly, by performing the learning of the classifier 108 by using this training data, it is possible to realize a classification performance that is hardly any different from the performance of learning based on an actual image.

Moreover, in the first embodiment of the present invention, the image processing device 10 uses a combination of the evaluation unit 104 and the training data generation unit 105. It is thereby possible to provide an image processing device which identifies and generates the training data for reducing the misrecognition based on the classification error characteristics of the learned classifier 108, and continues to update the classifier 108 based on the training data.

Moreover, in the first embodiment of the present invention, the output unit 106 provides the termination condition of update learning of the classifier 108. It is thereby possible to terminate the learning at a preferred timing. Consequently, it is possible to perpetually continue learning without interruption 24 hours a day, 365 days a year, for reducing prediction errors.

According to the first embodiment of the present invention explained above, the following effects are yielded.

(1) The image processing device 10 evaluates a classifier 108 which recognizes or discriminates a target object within an input image and classifies the target object into one among a plurality of classes. The image processing device 10 comprises a classification unit 103, and an evaluation unit 104. The classification unit 103 obtains a classification performance of the classifier 108 by using the classifier 108 to classify the target object included in each of a plurality of verification images in which a class of the target object is known, and outputting one among the plurality of classes for each of the verification images (step S2003). The evaluation unit 104 outputs an evaluation result of the classifier 108 based on the classification performance of the classifier 108 obtained with the classification unit 103 (step S2004). It is thereby possible to properly evaluate the classification performance of the classifier 108.

(2) The plurality of classes into which the target object is recognized and classified by the classifier 108 are configured by including a plurality of superordinate categories, and a plurality of sub categories obtained by additionally subdividing each of the plurality of superordinate categories. The classification unit 103 obtains, as the classification performance of the classifier 108, an evaluation value based on a predetermined evaluation standard for each of the superordinate categories and each of the sub categories as shown in the evaluation table 301 of FIG. 3. The evaluation unit 104 outputs, based on the evaluation value, at least one among the plurality of superordinate categories and at least one among the plurality of sub categories as the evaluation result of the classifier 108. It is thereby possible to output the evaluation result of the classifier 108 in an easy to understand manner.

(3) The evaluation unit 104 can also determine the sub category to be output as the evaluation result of the classifier 108 based on the evaluation value and a correlation between each of the sub categories. Because it is thereby possible to output sub categories with high mutual correlation as the evaluation result, it is possible to more properly evaluate the classification performance of the classifier 108.

(4) The image processing device 10 further comprises a training data generation unit 105, and a learning unit 102. The training data generation unit 105 generates training data for use in learning of the classifier 108 based on the evaluation result of the classifier 108 output from the evaluation unit 104 (step S2005). The learning unit 102 performs learning of the classifier 108 based on the training data generated by the training data generation unit 105 (step S2002). It is thereby possible to automatically and reliably improve the classification performance of the classifier 108.

(5) The training data generation unit 105 generates a training image for use in the training data by synthesizing, via physically based rendering, object data including geometric information and material information, and background data including a global image or three-dimensional shape information (step S5005). It is thereby possible to reliably generate a proper training image for use in the learning of the classifier 108.

(6) The training data generation unit 105 outputs, as the training data, the generated training image, and at least one piece of information among coordinate information of the target object in the training image, coordinate information of a specific part of the target object, class information of the target object, and attribute information of the target object. The classification performance of the classifier 108 can be reliably improved by performing the learning of the classifier 108 with the foregoing training data.

(7) The training data generation unit 105 stores history information 403 of parameters which were previously used upon generating the training data. The training data generation unit 105 generates the training data by using parameters which are different from the previously used parameters based on the parameter history information 403. It is thereby possible to reliably generate training data that is effectively for the learning of the classifier 108.

(8) The image processing device 10 further comprises an output unit 106. The output unit 106 determines whether a learning state of the classifier 108 by the learning unit 102 satisfies a predetermined termination condition (S2006). The learning unit 102 terminates the learning of the classifier 108 when the output unit 106 determines that the learning state of the classifier 108 has satisfied the termination condition. It is thereby possible to terminate the classifier 108 at the proper timing.

Second Embodiment

An embodiment applied to a cloud service is now explained as the second embodiment of the present invention.

Figure 9:
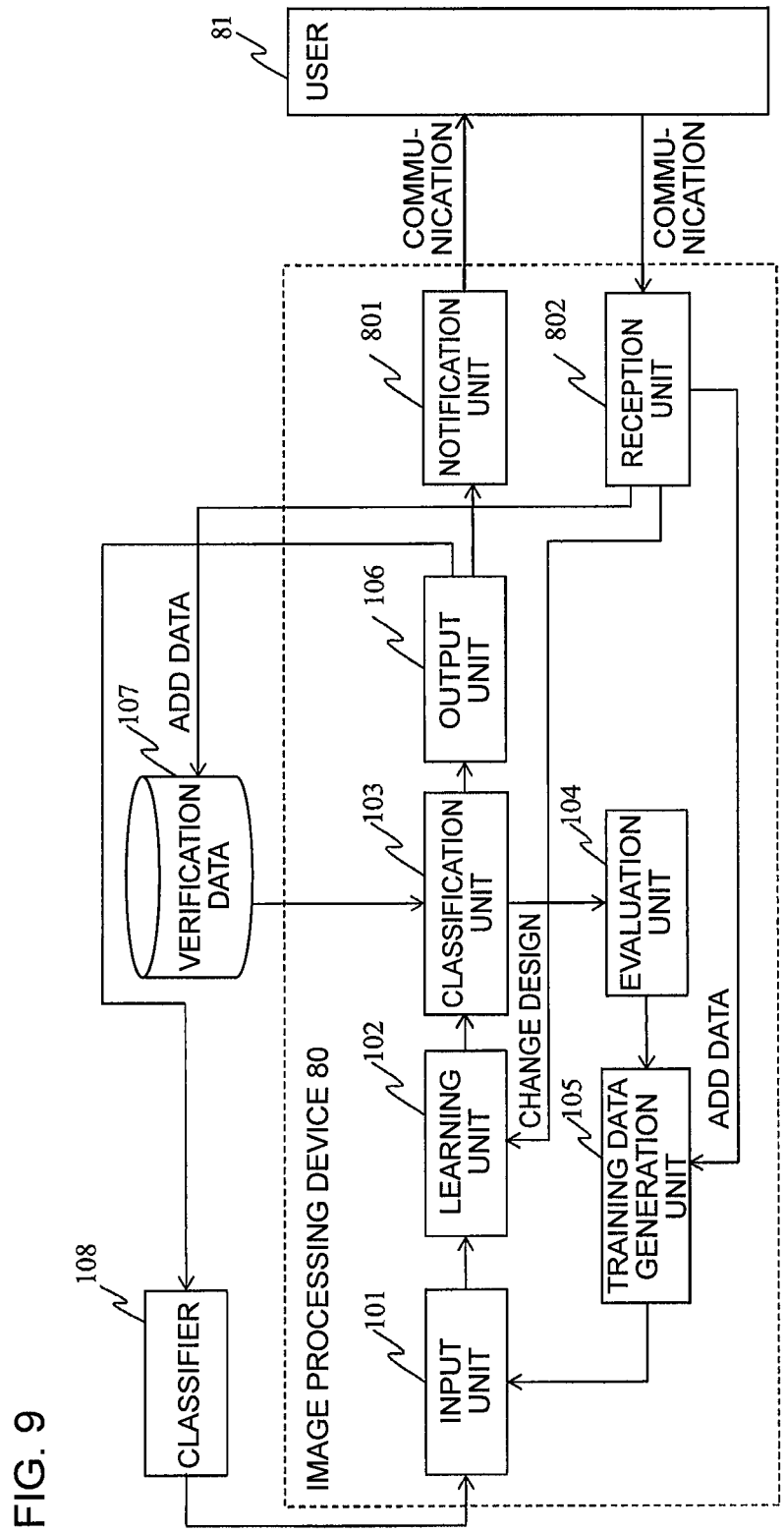
FIG. 9 is a block diagram showing a configuration of the image processing device according to the second embodiment.

FIG. 9 is a block diagram showing a configuration of an image processing device 80 according to the second embodiment of the present invention. The image processing device 80 shown in FIG. 9 further comprises a notification unit 801 which conveys information to a user 81 using a cloud service, and a reception unit 802 which receives information from the user 81. Note that, among the constituent elements of the image processing device 80 according to this embodiment, the same reference numeral as FIG. 1 is assigned in FIG. 9 for the same constituent elements of the image processing device 10 according to the first embodiment shown in FIG. 1. In the ensuing explanation, the explanation of these constituent elements will be omitted.

The notification unit 801 notifies the learning state of the classifier 108 by the learning unit 102 to the user 81 based on the information output from the output unit 106. Notification from the notification unit 801 includes, for example, various types of information related to the learning of the classifier 108 such as the classification error characteristics of the classifier 108 obtained with the evaluation unit 104, and the convergence status of the learning determined with the output unit 106. The user 81 is thereby possible to comprehend the processing status in the image processing device 80.

Figure 10:
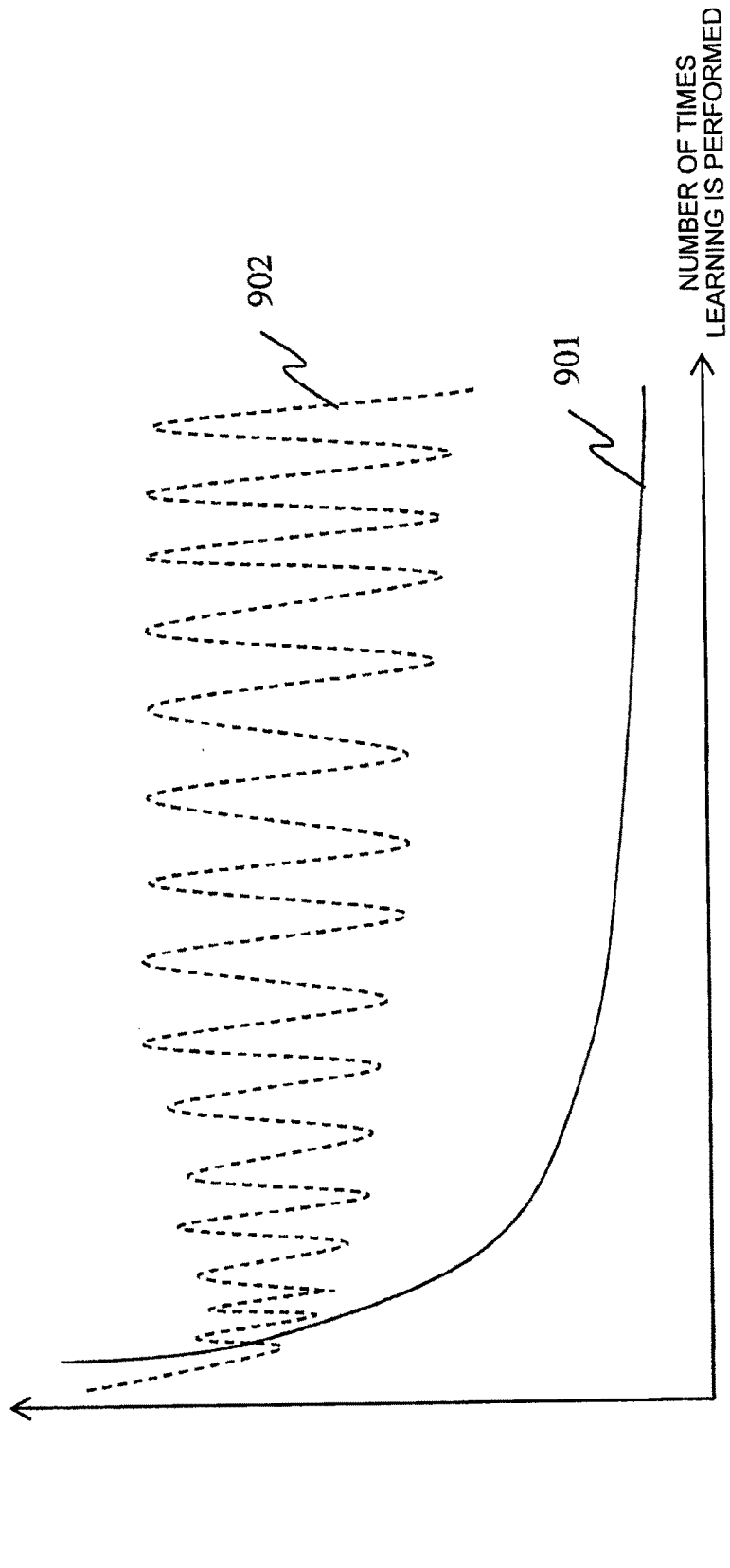
FIG. 10 is a diagram showing an example of the convergence status of the learning of a classifier.

The notified content from the notification unit 801 is now explained with reference to FIG. 10. FIG. 10 is a diagram showing an example of the convergence status of the learning of the classifier 108 by the learning unit 102. In FIG. 10, the horizontal axis represents the number of times learning is performed, and the vertical axis represents the prediction error. Generally speaking, in machine learning, as shown with a curve 901, the prediction error decreases each time learning is repeated. Nevertheless, if the method of learning is inappropriate, as shown with a curve 902, there are cases where the prediction error does not decrease even when learning is repeated. As the reasons for this, it may be that the learning parameters are inappropriate, the verification data is insufficient, the data used for generating training data is insufficient, or the category design is difficult to classify to begin with. Thus, when the prediction error does not decrease sufficiently as with the curve 902, the notification unit 801 in this embodiment notifies the reason thereof to the user 81. The user 81 receives the notified information and instructs various types of operations to the image processing device 80 for eliminating the reason such as adding the verification data to the database 107, adding the object data 401 and the background data 402 of FIG. 5 for use in generating the training data in the training data generation unit 105, or changing the design of the learning unit 102. The reception unit 802 receives the instructions from the user 81, performs various types of operations for improving the classification accuracy of the target object to be classified by the classifier 108, and optimizes the processing of the image processing device 80.

As explained above, in the second embodiment of the present invention, the image processing device 80 is provided with a notification unit 801 which notifies information to a user, and a reception unit 802 which receives information form a user. It is thereby possible to realize a cloud service which executes learning without interruption 24 hours a day, 365 days a year. Moreover, by adopting a configuration where the user updates data as needed, machine learning can be started from a small scale. Moreover, the user can more preferably use the service by receiving the sequentially updated classifier 108.

According to the second embodiment of the present invention explained above, the following effects are further yielded in addition to (1) to (8) explained in the first embodiment.

(9) The image processing device 80 further comprises a notification unit 801 which notifies a learning state of the classifier 108 by the learning unit 102 to a user. The user is thereby able to confirm the learning state of the classifier 108.

(10) The image processing device 80 further comprises a reception unit 802 which receives an instruction from the user and performs an operation for improving the classification accuracy of the target object by the classifier 108. The user is thereby able to improve the classifier 108 as needed.

Third Embodiment

An embodiment applied to an approaching object alarm in an in-vehicle system or an intruder alarm in a monitoring system is now explained as the third embodiment of the present invention.

Figure 11:
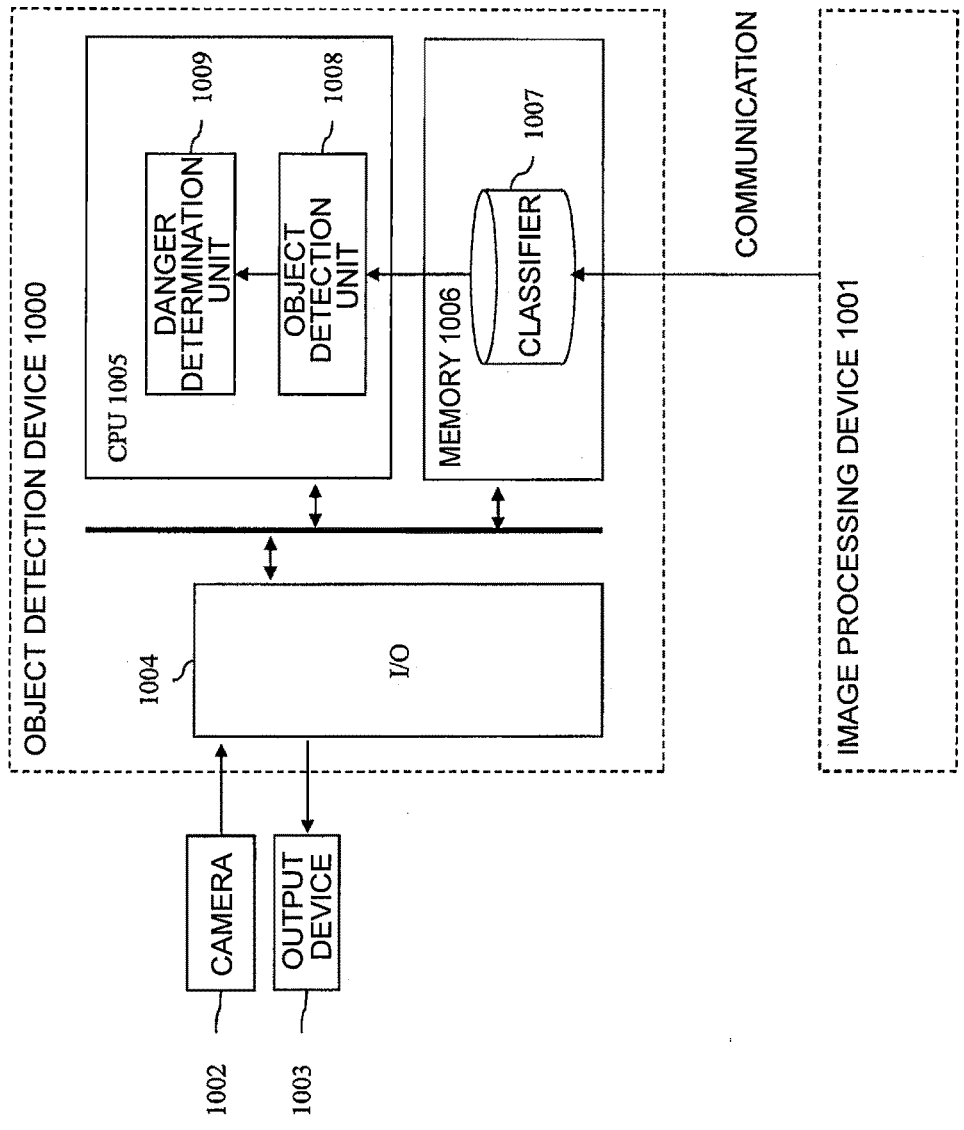
FIG. 11 is a block diagram showing a configuration of the image processing system according to the third embodiment.

FIG. 11 is a block diagram showing a configuration of the image processing system according to the third embodiment of the present invention. The image processing system shown in FIG. 11 comprises an object detection device 1000 which detects an approaching object or an intruder, an image processing device 1001, a camera 1002, and an output device 1003. The camera 1002 acquires an image (a picture) obtained by capturing the periphery of the object detection device 1000, and outputs an image signal based on the image to the object detection device 1000. The output device 1003 emits an alarm based on an alarm signal output from the object detection device 1000 by using a display or a speaker.

The object detection device 1000 comprises an I/O unit 1004 which functions as an input/output interface for performing the input/output of various types of data, a CPU 1005 which functions as a processing unit for executing various types of operations, and a memory 1006. The CPU 1005 comprises, as its functions, an object detection unit 1008 which executes object detection, and a danger determination unit 1009 which determines danger.

Note that the object detection device 1000 and the image processing device 1001 do not necessarily need to be installed at the same location. For example, the image processing system of this embodiment can also be realized with a client server system in which the image processing device 1001 is installed in a server, and the object detection device 1000 is operated at a client. Moreover, the processing performed in the CPU 1005 may also be parallel processing utilizing a GPU.

The image processing device 1001 outputs the classifier 1007 to be used in the object detection device 1000 by communicating with the object detection device 1000. As the image processing device 1001, the image processing device 10 in the first embodiment or the image processing device 80 in the second embodiment may be used. In other words, the image processing device 1001 outputs the classifier 108, which was subject to learning by the learning unit 102 in FIG. 1 or FIG. 9, as the classifier 1007 to the object detection device 1000. The classifier 1007 is stored in the memory 1006 of the object detection device 1000.

The object detection unit 1008 performs object detection by using the classifier 1007 to the image acquired with the camera 1002. In other words, the object detection unit 1008 detects the position and size of the target object in the image by classifying, with the classifier 1007, the target object included in the image input from the camera 1002. Here, rather than performing the object detection with a single frame of the image, it is also possible to perform object detection in a plurality of frames by simultaneously using a known tracking method based on time series information. The danger determination unit 1009 determines the danger of the object detected with the objection detection unit 1008 based on known indexes such as proximity and level of abnormality. Consequently, when it is determined that the possibility of danger is high, an alarm signal is sent to the output device 1003. Upon receiving this alarm signal, the output device 1003 sends an alarm to the user by using a display or a speaker. Here, when applying the object detection device 1000 as a system to be installed in a vehicle, rather than outputting an alarm signal to the output device 1003, a control signal for performing brake control or steering control may also be output to a vehicle.

As explained above, in the third embodiment of the present invention, the object detection device 1000 performs object detection by using the classifier 1007 that was learned in the image processing device 1001. Thus, it is possible to realize an approaching object alarm in an in-vehicle system and an intruder alarm in a monitoring system. Moreover, by changing the output signal according to the danger, the present invention can also be used as a control system in addition to an alarm system. Moreover, by connecting the image processing device 1001 and the object detection device 1000 via a network, the classifier 1007 can be updated online, and suitable object detection can be performed. For example, the classifier 1007 can also be rewritten in a factory or a store.

According to the third embodiment of the present invention explained above, the following effects are further yielded in addition to (1) to (10) explained in the first and second embodiments.

(11) The object detection device 1000 comprises an object detection unit 1008, and a danger determination unit 1009. The object detection unit 1008 detects an object in an image input from the camera 1002 by using the classifier 1007 which was subject to learning by using the image processing device 1001. The danger determination unit 1009 determines the danger of the object detected with the object detection unit 1008. It is thereby possible to reliably and accurately detect the object, and determine the danger thereof.

Note that the present invention is not limited to each of the embodiments described above, and may be modified variously so as long as the modification does not deviate from the subject matter of the present invention. For example, the foregoing embodiments were explained in detail for explaining the present invention in an easy-to-understand manner, and the present invention does not need to necessarily comprise all of the configurations explained in the embodiments. Moreover, a part of the configuration of a certain embodiment may be replaced with the configuration of another embodiment, and the configuration of another embodiment may be added to the configuration of one embodiment. Moreover, another configuration may be added to, deleted from or replaced with a part of the configuration of each embodiment.

Moreover, a part or all of the respective configurations, functions, processing units, and processing means described above may be realized with hardware such as an integrated circuit. Moreover, information of programs, data and files for realizing the respective configurations and functions may be recorded in a memory, a hard disk, an SSD (Solid State Drive) or any other recording device, or may otherwise be recorded on an IC card, an SD card, a DVD or any other recording medium. In addition, the foregoing information may be downloaded or installed via a wireless network as needed.

REFERENCE SIGNS LIST

10, 80, 1001 . . . Image processing device
101 . . . Input unit
102 . . . Learning unit
103 . . . Classification unit
104 . . . Evaluation unit
105 . . . Training data generation unit
106 . . . Output unit
107 . . . Database
108 . . . Classifier
401 . . . Object data
402 . . . Background data
403 . . . Parameter history information
404 . . . Object setting unit
405 . . . Background setting unit
406 . . . Parameter setting unit
407 . . . Training image generation unit
408 . . . Annotation unit
801 . . . Notification unit
802 . . . Reception unit
1000 . . . Object detection device

The invention claimed is:

1. An image processing device for evaluating a classifier which performs recognition with respect to a plurality of classes, comprising:

a classification unit which obtains a classification performance of the classifier by using the classifier to classify a plurality of different target objects respectively included in a plurality of verification images in which the respective classes of the target objects are known, and output one of the classes among the plurality of classes for each of the verification images;

an evaluation unit which outputs a plurality of respective evaluation results of the classifier for the plurality of classes based on the classification performance of the classifier obtained with the classification unit, and identifies at least one of the classes with insufficient training data based on the respective evaluation results of each of the at least one of the classes not satisfying a predetermined threshold value, a training data generation unit which generates training data including at least one training image for use in learning of the classifier based on the evaluation results; and a learning unit which performs learning of the classifier based on the at least one training image, wherein the training data generation unit generates each of the at least one training image by synthesizing, via physically based rendering, object data including geometric information and material information of a target object corresponding to the identified at least one of the classes with insufficient training data, and background data including a global image or three-dimensional shape information.

2. The image processing device according to claim 1, wherein:

the plurality of classes are configured by including a plurality of superordinate categories, and a plurality of sub categories obtained by additionally subdividing each of the plurality of superordinate categories;

the classification unit obtains, as the classification performance of the classifier, a plurality of respective evaluations value based on a predetermined evaluation standard for each of the superordinate categories and each of the sub categories; and the evaluation unit outputs, based on the evaluation values, the evaluation results which identifies at least one among the plurality of superordinate categories and at least one among the plurality of sub categories as the at least one of the classes with insufficient training data.

3. The image processing device according to claim 2, wherein:

the evaluation unit determines the at least one among the plurality of sub categories based on the evaluation values and a correlation between each of the sub categories.

4. The image processing device according to claim 1, wherein:

the training data generation unit outputs the at least one training image, and at least one piece of information among coordinate information of a respective target object in each of the at least one training image, coordinate information of a specific part of the respective target object, class information of the respective target object, and attribute information of the respective target object.

5. The image processing device according to claim 1, wherein:

the training data generation unit stores history information of previously used parameters which were previously used when generating a previous at least one training image, and generates the at least one training image by using parameters which are different from the previously used parameters based on the history information.

6. The image processing device according to claim 1, further comprising:

an output unit which determines whether a learning state of the classifier by the learning unit satisfies a predetermined termination condition, wherein:

the learning unit terminates the learning of the classifier when the output unit determines that the learning state of the classifier has satisfied the termination condition.

7. The image processing device according to claim 1, further comprising:

a notification unit which notifies a learning state of the classifier by the learning unit to a user.

8. The image processing device according to claim 7, further comprising:

a reception unit which receives an instruction from the user and performs an operation for improving a classification accuracy of the target object by the classifier.

9. An object detection device, comprising:

an object detection unit which detects an object in an image input from a camera by using the classifier which was subject to learning by using the image processing device according to claim 1; and a danger determination unit which determines a danger of an object detected by the object detection unit.

10. An image processing method executed by a computer for evaluating a classifier which performs recognition with respect to a plurality of classes, comprising:

obtaining a classification performance of the classifier by using the classifier to classify a plurality of different target objects respectively included in a plurality of verification images in which the respective classes of the target objects are known, and output one of the classes among the plurality of classes for each of the verification images;

outputting a plurality of respective evaluation results of the classifier for the plurality of classes based on the classification performance of the classifier, and identifying at least one of the classes with insufficient training data based on the respective evaluation results of each of the at least one of the classes not satisfying a predetermined threshold value;

generating at least one training image for use in learning of the classifier based on the evaluation results; and performing learning of the classifier based on the at least one training image, wherein each of the at least one training image is generated by synthesizing, via physically based rendering, object data including geometric information and material information of a target object corresponding to the identified at least one of the classes with insufficient training data, and background data including a global image or three-dimensional shape information.

* * * * *